United States Patent [19]
Dockter et al.

[11] Patent Number: 5,854,923
[45] Date of Patent: Dec. 29, 1998

[54] FACILITY FOR THE INTELLIGENT SELECTION OF INFORMATION OBJECTS (PERSONA)

[75] Inventors: Michael J. Dockter, Hollister; Joel F. Farber, San Jose, both of Calif.; Kevin D. Seppi, Austin, Tex.

[73] Assignee: International Business Machines Corp., Armonk, N.Y.

[21] Appl. No.: 262,834

[22] Filed: Jun. 21, 1994

[51] Int. Cl.$^6$ .................................................. G06F 17/30
[52] U.S. Cl. ............................. 395/605; 395/12; 395/63
[58] Field of Search ................................. 395/600, 159, 395/161, 700, 148–157, 50–60, 605, 160

[56] References Cited

U.S. PATENT DOCUMENTS

| | | | |
|---|---|---|---|
| 4,905,163 | 2/1990 | Garber et al. | 395/63 |
| 4,914,586 | 4/1990 | Swinehart et al. | 395/612 |
| 4,930,071 | 5/1990 | Tou et al. | 395/604 |
| 4,996,642 | 2/1991 | Hey | 395/227 |
| 5,123,088 | 6/1992 | Kasahara et al. | 395/357 |
| 5,132,900 | 7/1992 | Gichrist et al. | 395/609 |
| 5,197,005 | 3/1993 | Shwartz et al. | 395/602 |
| 5,201,047 | 4/1993 | Naki et al. | 395/604 |
| 5,263,167 | 11/1993 | Conner, Jr. et al. | 395/604 |
| 5,321,833 | 6/1994 | Chang et al. | 395/605 |
| 5,408,655 | 4/1995 | Oren et al. | 395/601 |
| 5,446,891 | 8/1995 | Kaplan et al. | 395/602 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS

Microsoft Press Computer Dictionary, 2nd Edition, 1994, p. 272.
"Object–Oriented Database Management Systems: Concepts and Issues", Bertino et al., University of Genove, Dept. of Math., Italy, Computer, vol. 24, issue 4, pp. 33–47, Apr. 1991.
"Probabilistic Object–Oriented Data Model", Korantzky et al., Data & Knowledge Engineering, 1994, v12, n2, (Mar.), pp. 143–166.
"DSS Software Evaluation and Selection", Rushnek, Avi; Rushnek, Sara; Information Executive, v4, n2, p. 40(6), Mar. 1991.
"Information Filtering and Retrieval: Two sides of the same coin", Belkin, Nicolas J.; Croft, W. Bruce; Communications of the ACM, v35, n12, p. 29(10), Dec. 1992.
"Competitive Agents for Information Filtering", Paul E. Baclace, Communications of the ACM, v35, n12, p. 50(1), Dec. 1992.
IBM Dictionary of Computing, Oct. 1991, p. 388.
7.0 Appendix A. Related Industry Acticles/Data, 7.1 Hypertext Requirements, Oct. 1991.

*Primary Examiner*—Thomas G. Black
*Assistant Examiner*—Hosian T. Alam
*Attorney, Agent, or Firm*—Randy W. Lacasse; David J. Kappos; Marylin S. Dawkins

[57] ABSTRACT

A system to intelligently link a computer user to enormous databases of multi-media information. The system provides an automated facility to determine the value of information based on each user's subjective preferences. An execution is created by comparing these preferences with prior characterizations of information objects. Once the comparisons are made, an ordered list is compiled. The list provides a set of data sources starting with the most relevant and ending with the least relevant. By selecting and reviewing only the most significant references, the probability of locating a pertinent reference is increased dramatically while increasing the effectiveness of time spent reviewing results.

12 Claims, 3 Drawing Sheets

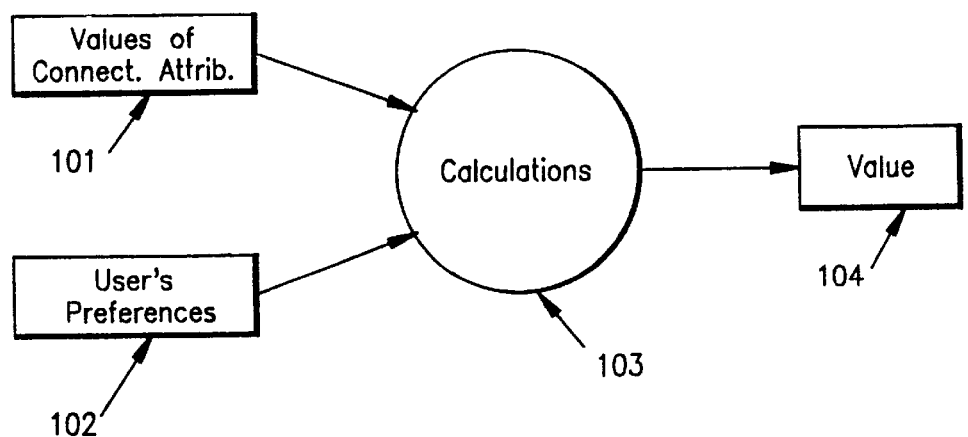

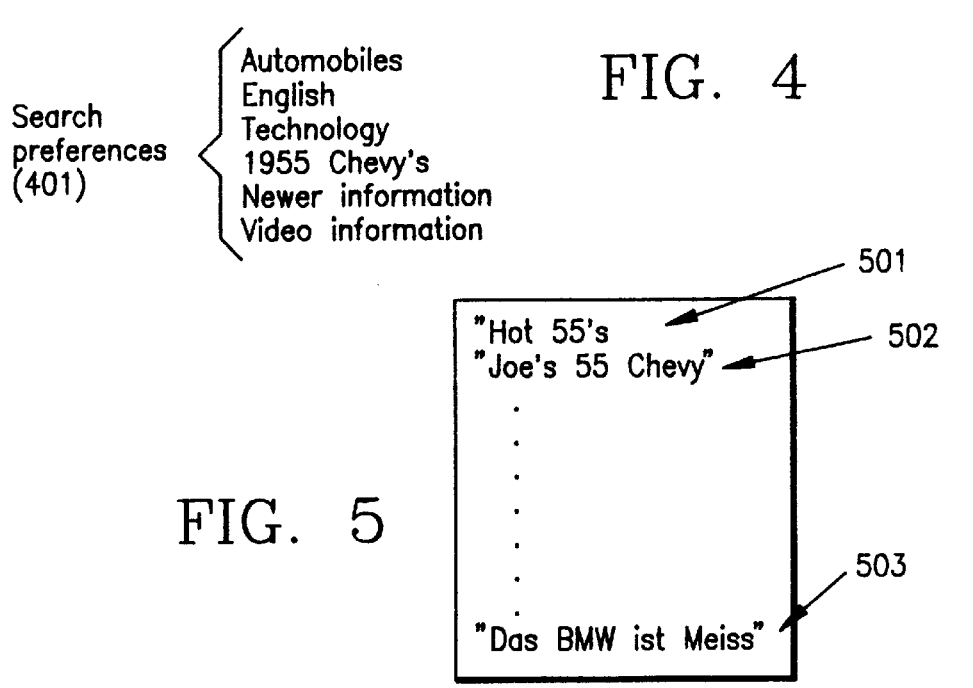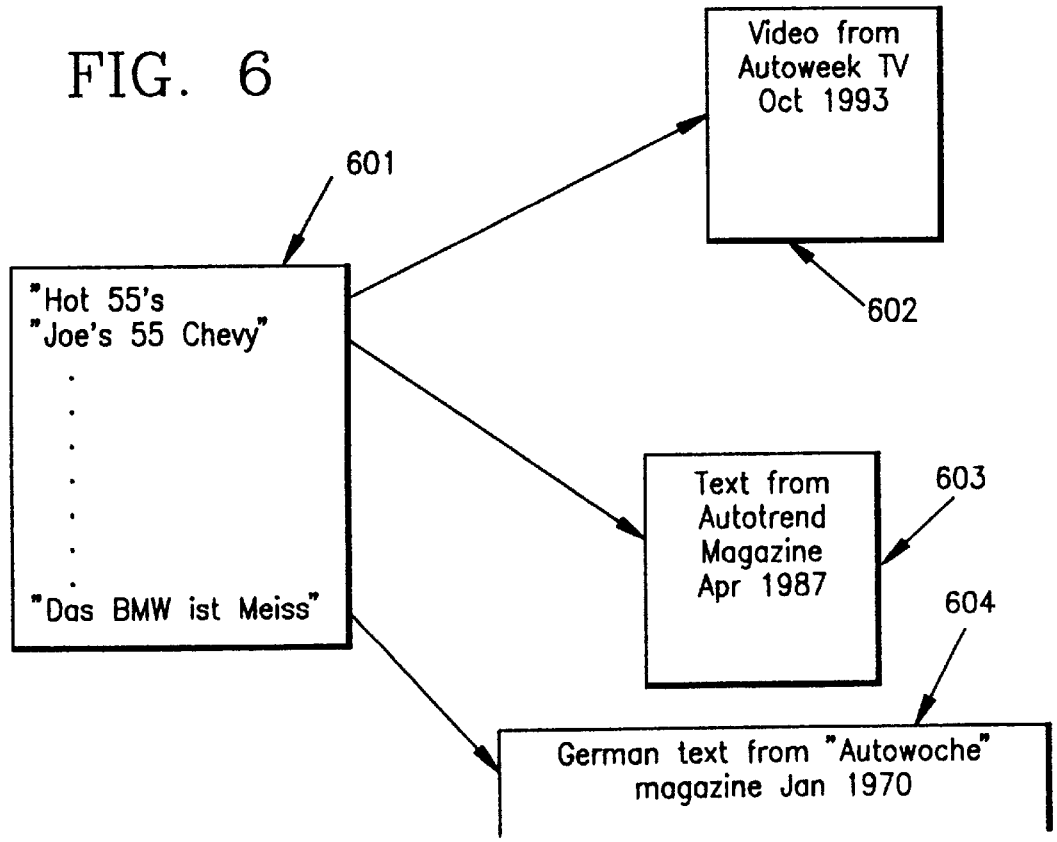

FACILITY FOR THE INTELLIGENT SELECTION OF INFORMATION OBJECTS (PERSONA)

BACKGROUND OF THE INVENTION

1. Field of Invention

The present invention relates to effectively coupling a computer user to multi-media data. More specifically, the present invention relates to a method to determine a value of selected subsets of multi-media based on a users' subjective preferences.

2. Related Materials and Definitions

This application is related to the following co-pending applications which are hereby incorporated by reference:

UNIVERSAL TAG IDENTIFIER ARCHITECTURE (Application Ser. No. 07/963,885), now U.S. Pat. No. 5,414,841

METHOD FOR GENERATING CONNECTIONS BETWEEN OBJECTS IN A COMPUTER NETWORK (GRINDING) (Application Ser. No. 08/262,999), now U.S. Pat. No. 5,608,900

FACILITY FOR THE STORAGE AND MANAGEMENT OF INFORMATION OBJECTS (NOUMEN SERVER) (Application Ser. No. 08/263,146), now U.S. Pat. No. 5,557,790

METHOD FOR THE ASSOCIATION OF HETEROGENEOUS INFORMATION (Application Ser. No. 08/262,838), FACILITY FOR THE STORAGE AND MANAGEMENT OF CONNECTIONS (CONNECTION SERVER) (Application Ser. No. 08/267,022) now abandoned and continued into Ser. No. 741,291 and METHOD FOR STORING AND RETRIEVING HETEROGENEOUS CLASSIFICATION SYSTEMS (Application Ser. No. 08/263,379).

The following definitions may be helpful to the understanding of the terminology as cited throughout the above related materials. This terminology may be used throughout the background, specification and claims of the present invention:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience. Phenomena can be ideas, written matter, video, computer data, etc. Examples include viewing a computer file using a word processor, watching a digital video clip or listening to a digital audio segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: Another concept in the logical structure of the system is "Noumena". Noumena are that which lie beyond the realm of human perception. In computer-based systems, such as the instant invention, they are the computer stored data, examples are "computer files" or "datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect a new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of co-pending application "Method for Association of Heterogeneous Information" It supports the Tag Architecture, Connection Server, Grinding, Noumena Server and the design and infrastructure of the overall system, but is not limited thereto. The term "Phenomena" could be read "object", and the term "Connection" could be read "link" in this disclosure. The distinction between Noumena and Phenomena is made to distinguish between objects as experienced by users (Phenomena) and objects as they are actually stored (Noumena).

DISCUSSION OF PRIOR ART

Accessing computer information has become an overwhelming task. Today databases, both local and distributed, contain enormous volumes of information. No longer are databases limited to textual entries but rather a whole world of data is now available in the form of video, audio, photographs, etc.—collectively referred to as multi-media. For the average person trying to locate a particular subset of data quickly, or at all, has become near impossible.

Various prior art systems have attempted to provide various filters to limit the breadth of information or to narrow the scope of a search for particular information. Common word searching techniques are useful in locating specific textual information desired. The user is limited, however, by their own knowledge of the techniques of word searching and by their knowledge and understanding of the subject for which they are seeking corresponding stored data. Narrowing the search with specific key words may obtain specific references which might be useful. The immediate consequences of using specific key words is potential elimination of many excellent sources germane to the subject matter desired. The converse, broadening the search terms, creates information overload with no immediate method to analyze the quantity or quality of the information. The user is forced to use additional key terms or other filters to eliminate sources of material until it approaches a manageable subset. Each filter stage eliminates potentially applicable references.

The following example might be helpful in illustrating typical word search limitations. If a user were trying to locate all computer stored information on "rock climbing", a simple word search on a small database of data, using the term "rock climbing", should produce a volume of manageable references which the user could then peruse. If the source database was now expanded to include many computer coded sources of data (i.e. network sources), the terms "rock climbing" would produce an enormous quantity of source documents. The user would be confronted with: articles on rock climbing, video (i.e. movies or recorded television about rock climbing), audio (recorded instructional tapes, songs), photographs, etc. The shear volume of material would be overwhelming with no intelligent means to synthesize the useful from the inapplicable.

The following are examples of known prior art.

HYPERTEXT/HYPERMEDIA

Hypertext, and its multimedia counterpart hypermedia, are methods used by programmers to interconnect references to additional related sources. Hypertext programmers usually store maps of selected links for a particular application within the application itself. These are "closed" systems with no external API's to add links from outside their application. Additional limitations of Hypertext are its static authoring linking process, rapid development of large volumes of data and its inability to crosslink easily to remotely located, and incompatible, sources of information. The most beneficial uses of hypertext/hypermedia are restricted to the workstation level.

Entity-Relationship model

Chen developed the "Entity-Relationship Model". Chen sought to model the relationships universal to a class of entities. His goal was to unify data models for the rigid, predefined, structure provided in database systems. The system fails to provide for a dynamic individualized method to interrelate instances of information, but rather is directed to relating entire classes of information.

It is therefore seen that a problem exists in the prior art to intelligently sift through large volumes of computer coded data sources to select references' which would be most useful or interesting to a specified requester.

OBJECTS OF THE INVENTION

It is an object of the invention to provide a method of valuing a subset of user selected data derived from computer coded data sources.

It is a further object of the invention to base said valuing method on the preferences of the user.

It is a further object of the invention to store prior characterizations of the user to develop a users subjective preferences.

It is a further object of the invention to provide to the user an ordered ranked list based on a comparison of the values of the subset of user selected data and the users subjective preferences.

It is further an object of the present invention to provide an ordered ranked list which is immediately useable to the requester.

SUMMARY OF THE INVENTION

In the world of information overload, the present invention provides an automated facility, hereafter "Persona", to determine the value of information based on each user's subjective preferences. An execution is created by comparing these preferences with prior characterizations of information objects. Once the comparisons are made an ordered list is compiled. The list provides a set of data sources starting with the most relevant and ending with the least relevant. By selecting and reviewing only the most significant references the probability of locating a pertinent reference is increased dramatically while increasing the effectiveness of time spent reviewing results.

The system delivers a knowledge service with minimum effort required to find the knowledge of most interest with the least cost and time. Knowledge can be presented in priority order for each user based on their history and preferences. Facilities are provided to identify, and process multi-media information on a universal scale.

Persona represents a point of view. This point of view is independent of the data. The output of the Persona estimates the value of the Connected Phenomena relative to a particular point of view. The point of view can vary from concrete and objective to fuzzy and subjective. This is unique in the world of software.

BRIEF DESCRIPTION OF THE DRAWINGS

FIG. 1 represents a flow diagram of the present invention.

FIG. 2 illustrates an example of the preferences of a user.

FIG. 4 illustrates an example of the search preferences of the user.

FIG. 5 illustrates an example of the ordered results as displayed to the user.

FIG. 6 illustrates an example of the information obtained by the ordered results.

DETAILS DESCRIPTION OF THE INVENTION

Figure 3:
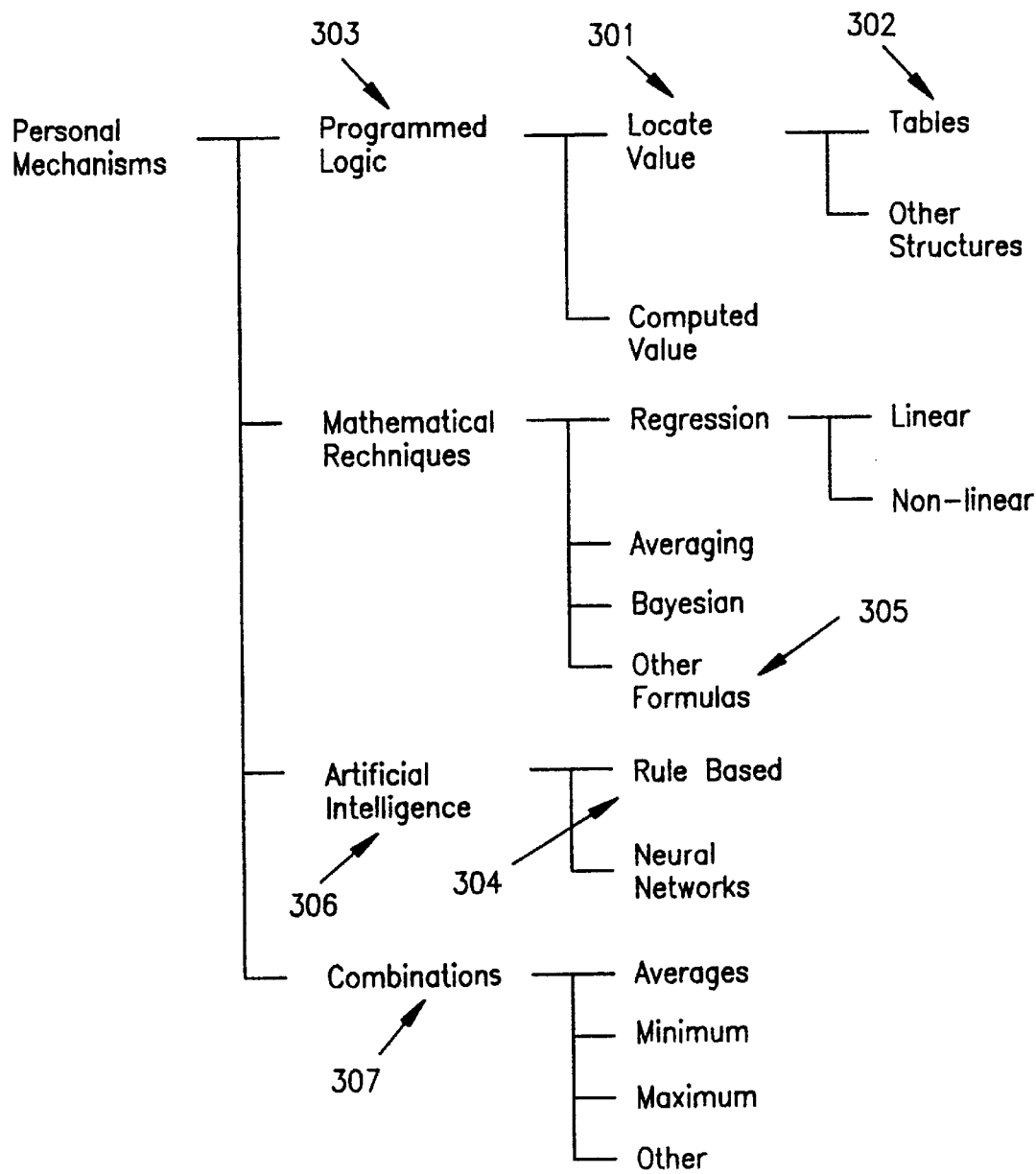
FIG. 3 illustrates a tree diagram of the various methods of implementing the present invention.

The present system, hereafter referred to as "Persona", helps alleviate the information overload situation by evaluating and categorizing the multi-media information available for presentation. A Persona is defined as a class of processes (computer programs) which evaluate Connections (links between Phenomena(stored data objects)) in light of user preferences.

In FIG. 1, the process of evaluating Connections in light of user preferences depends on two inputs: The first input 101 reflects the values of the selected set of Connection Attributes for a Connection. The second input 102 is a representation of the user's preferences. A series of calculations 103 is made based on these inputs and a value is returned 104. The specifics of this process will be discussed hereafter.

Connection Attributes characterize a relationship of one Phenomena to another Phenomena. This characterization can be made in terms of "adjective like" classifications of the subject Phenomena or in terms of "relational" classifications between the two connected Phenomena. This will help determine the relationship of the Phenomena pointed to by the Connection, as perceived by the observer who made the Connection.

The representation of the user's preferences can be encapsulated by several techniques including: computer programs, tables, rules, formulas, and/or methods based on heuristics and artificial intelligence techniques, especially neural networks.

FIG. 2 illustrates an example of a user's preferences. As can be seen in the example, the preferences 201 range from 0, dislike or of no usefulness, to 1, like or of greatest usefulness, and the confidence 202 is a positive integer. All attribute values not explicitly modeled have no influence. The particular user modeled in this example likes to look at examples 203 but not subsets 204, meaning that when looking at information on a topic, an example is more helpful to this user than focusing in on some part of it ( i.e. a subset). This user is interested in computers, cars, and philosophy 205, but the confidence on cars is low 206, meaning that this preference is easily overridden by other factors. This user prefers materials in English 207 the most and materials in German 208 the second most.

In this disclosure the above encapsulation is called the "Core encapsulation". Encapsulations can be constructed manually or automatically. One example of automatic construction techniques is to monitor the user's behavior to determine the user's preferences. Another example would be to query the user for the preferences as objects are displayed. FIG. 3 shows a tree diagram illustrating the various alternative methods to calculate a value for the Connection (which estimates the utility of a Connected Phenomena).

The values of the Connection Attributes may be:
  Input into a computer program which encapsulates the user's preferences 303.
  Used to locate the values 301 in data storage structures (i.e. tables 302 and other structures) which represent the user preferences.
  Evaluated using rules 304 which represent the user's preferences.
  Input into formulas 305 which represent the user's preferences.
  Input into artificial intelligence methods 306.
  Applied to a combination of the above techniques 307.

The resultant value is normalized (e.g. assigned on a scale from zero to one). All Persona in the system normalize to a value range from zero to one to facilitate combinations of Persona output.

Optionally, another process can combine a Persona's resultant values with results from other Persona. This allows Persona developed separately to be combined.

Set of Connections

Up to this point, the discussion has been limited to the evaluation of a single Connection. In an instance of the system of co-pending application "METHOD FOR THE ASSOCIATION OF HETEROGENEOUS INFORMATION", there are many Connections to evaluate. This evaluation would be intractable except that at each step, as the user navigates through the available information, algorithms are applied to limit the number of edges evaluated. For example: only neighboring information may be considered. That is, only Connections emanating from the "current" node are considered. By human standards this may be a large number of Connections, but it is a mere fraction of the total number of Connections in the system, and can be rapidly processed by the Persona.

Having evaluated a subset of Connections on a normalized scale, the results can be easily ordered for presentation. Additionally, since the resulting values are normalized they can be integrated with output of other Persona for presentation.

A generalized algorithm for Connection evaluation is as follows:

1. Select an appropriate algorithm to limit the number of Connections to search (e.g. only directly emanating connections).
2. For each Connection selected by the above algorithm:
   a. Obtain the set of Connection Attributes (the domains) for the current Connection from the Connection Server.
   b. From this set, select the values of the Connection Attributes used as input for the Core encapsulation.
   c. Apply default values as necessary for any Connection Attributes used as input for the Core encapsulation, but not specified explicitly for this Connection.
   d. Apply one of the various methods described for Core encapsulation to determine the resultant value.
   e. Scale the prior resulting value to a canonical range.
   f. Save this Connection and its estimated value from this process (output the data).
   g. Continue until all selected Connections have been processed or the user chooses to discontinue.

The process outline above may be done serially or in parallel.

FIG. 4 is a list of search preferences. These preferences 401 allow the Persona to rank or grade available information objects. FIG. 5 shows references 501, 502, 503 to available information objects in rank order. This allows the user to identify the most relevant information sources. Color could also be used to allow the user to visually distinguish a long list of highly valued sources from a long list of poor sources.

FIG. 6 shows the list of references 601 with the associated information objects 602, 603, 604. In the preferred embodiment users can retrieve and view the associated information object by marking the corresponding reference. In this example a quick comparison of the search preferences shown in FIG. 4 with the ordering of references shown in FIG. 6 demonstrates the actions of the Persona.

DESCRIPTION OF THE PREFERRED EMBODIMENTS

In the preferred embodiment, the estimated value of a Connection is computed based on an arbitrary mapping of Connection Attribute values combined with a linear function. Simple programmed logic is implemented, based on the date of creation of the Phenomena, combined with increased priority due to specific areas of personal interest.

In the following example, the user specified priority topics are: "computer science" and "automotive technology".

This algorithm only considers Connections directly adjacent to the current node. A wider pattern of specified depth could also be evaluated.

The algorithm is as follows:
1. Request all Connections emanating from the current Phenomena and their corresponding Connection Attributes as stored in the Connection Server.
   The current Phenomena is identified by a globally unique identifier, e.g. a Tag.
2. For each Connection and its Connection Attributes:
   a. Obtain the Connection Attribute values used as input for the Core Encapsulation. The Connection Attributes of interest in this example are: Creation date-time stamp, and topic.
   b. Use default values for any Connection Attributes needed as input for the Core Encapsulation, but not found for this Connection.
   c. Apply the Core Algorithm to determine an intermediate value.

1) The age of the Connected Phenomena is computed using the current date/time-stamp and the creation date from the Connection Attribute specified above. This results in "age" in days and hours.
2) Normalize the age of the articles:
   Set any article having a creation date before 1950 to a creation date of 1950. Then compute the normalized age by applying the following formula:
   (The difference in time between the creation of target article and the year 1950) divided by (The difference in time between the current-date-timestamp and the year 1950).
3) Set the "preference coefficient" based on the "topic" Connection Attribute:
   a) For computer science, set the preference coefficient to 0.90.
   b) For automotive technology, set the preference coefficient to 0.60.
   c) For all other topics, set the preference coefficient to 0.40.
   Thus, computer science material is more interesting than the automotive material which in turn is more interesting than other articles. This table of preference coefficients was created subjectively by the user.
d. Multiply the normalized age by the preference coefficient to yield the estimated value of the Connection.
e. Return this Connection and its estimated value to the user for presentation in estimated value order.
f. Continue until all Connections have been processed or the user chooses to discontinue.

3. Indicate completion to the user.

Persona are data driven (e.g. using the Connection Attribute data of the related materials). This information is not collected nor stored on a per user basis, but on the basis of the Connection Attributes, dramatically increasing efficiency.

Connection Attributes and their values are the input to the Persona. Connection Attributes provide the meta-data used by the Persona to intelligently guide the user through the graph of Connected Phenomena.

The Persona is able to operate in the absence of complete information (e.g. Connection Attributes) by the use of default information value substitution.

Persona are shareable. Users may be authorized to use Persona constructed for use by others.

New Persona can be synthesized from existing Persona. For example: Persona "C" may be created by algorithmically combining 30% of Persona "A" and 70% of Persona "B".

Because Persona yield results in the range 0–1, a Persona can be synthesized dynamically using techniques from the Probability Theory.

Persona need not be unique; multiple Persona may be owned and used by an individual or group.

Persona process independence; the system design allows structural independence of most processes enabling exploitation of computers that may be loosely coupled, multi-threaded, and/or support parallel processing.

In the co-pending "Method for Association of Heterogeneous Information", Persona may be deployed as a single location (node) or as a network (distributed) or Connected location (nodes).

CONCLUSION

A system and method has been shown in the above embodiments for the effective coupling of a computer user to multi-media data. More specifically, the present invention provides a method to determine a value of selected subsets of multi-media based on a users subjective preferences. While various preferred embodiments have been shown and described, it will be understood that there is no intent to limit the invention by such disclosure, but rather, it is intended to cover all modifications and alternate constructions falling within the spirit and scope of the invention as defined in the appended claims.

We claim:

1. A computer-based method for ordering information objects for presentation to a requester, comprising the steps of:

receiving a set of information objects, connections between the information objects, and attributes associated with the connections;

receiving a first profile descriptor representing a first user's information preferences and predetermined characteristics;

said first profile descriptor including a preference field and a confidence field associated with said preference field;

determining a subset of the information objects, connections, and attributes based on said first profile descriptor;

computing at least first utility values for the connections in the determined subset as a function of the connection attributes and the first profile descriptor;

normalizing the utility values, and wherein the preferences of the information objects identified by the connections are ordered according to the normalized utility values computed for the connections.

2. The method as recited in claim 1, further comprising the steps of:

receiving a second profile descriptor representing a second user's information preferences and prior characterizations;

determining a second subset of the information objects, connections, and attributes based on the second profile descriptor;

computing utility values for the connections in the second determined subset as a function of the connection attributes and the profile descriptor for the second user;

combining the normalized utility values for the first user with normalized utility values for the second user to form meta utility values, and ordering information objects identified by the connections according to the meta utility values computed for the connections.

3. The method as recited in claim 1, wherein the received first user profile descriptor represents user information preferences and prior characterizations for a computer user other than the first computer user receiving the user profile descriptor.

4. The method as recited in claim 1, wherein the received user profile descriptor includes combined information preferences for a plurality of computer users.

5. The method as recited in claim 1, wherein the connection attributes are valued meta data.

6. The method as recited in claim 1, wherein the function used to compute the utility values is a neural net.

7. The method as recited in claim 1, wherein the function used to compute the utility values is rule-driven.

8. The method as recited in claim 1, wherein the function used to compute the utility values is a regression.

9. The method as recited in claim 1, wherein the function used to compute the utility value is the combination of two or more mathematical functions which produce utility values.

10. The method as recited in claim 1, further comprising the steps of:

computing second utility values for the connections in the determined subset as a second function for the connection attributes and the first profile descriptor;

normalizing the second utility values, and ordering information objects identified by the connections according to the normalized second utility values computed for the connections.

11. The method as recited in claim 1, further comprising the steps:

comparing the normalized utility values to a predetermined critical utility level; and highlighting or coloring the presentation of information objects associated with normalized utility values above the predetermined critical utility level.

12. The method as recited in claim 1, wherein multiple user preferences may be layered.

* * * * *

UNITED STATES PATENT AND TRADEMARK OFFICE
CERTIFICATE OF CORRECTION

PATENT NO. : 5,854,923  Page 1 of 1
DATED : December 29, 1998
INVENTOR(S) : Dockter et al.

It is certified that error appears in the above-identified patent and that said Letters Patent is hereby corrected as shown below:

Drawings,
Figure 3, delete "Mathematical Rechniques" insert therefore -- Mathematical Techniques --.
Figure 5, delete "Meiss" insert therefore -- Heiss --.
Figure 5, after "Hot 55's" insert -- " --.
Figure 6, after "Hot 55's" insert -- " --.
Figure 6, delete "Meiss" insert therefore -- Heiss --.

Column 1,
Line 24, delete "NOUMEN" insert therefore -- NOUMENA --.
Line 31, delete "CONNECTIONS" insert therefore -- CONNECTION --.

Column 4,
Line 8, after "made" insert therefore -- , --.
Line 12, after "references" insert therefore -- , --.
Line 48, delete "Phenomena(stored data objects))" insert therefore -- Phenomena (stored data objects)) --.

Column 6,
Line 31, after "embodiment" insert therefore -- , --.
Line 33, after "example" insert therefore -- , --.

Column 8,
Line 3, delete "users" insert therefore -- user' -- .

Signed and Sealed this

Sixteenth Day of April, 2002

Attest:

Attesting Officer

JAMES E. ROGAN
*Director of the United States Patent and Trademark Office*